(12) United States Patent
Chang et al.

(10) Patent No.: US 11,017,791 B2
(45) Date of Patent: May 25, 2021

(54) DEEP NEURAL NETWORK-BASED METHOD AND APPARATUS FOR COMBINING NOISE AND ECHO REMOVAL

(71) Applicant: Industry-University Cooperation Foundation Hanyang University, Seoul (KR)

(72) Inventors: Joon-Hyuk Chang, Seoul (KR); Hyeji Seo, Seongnam-si (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/604,777

(22) PCT Filed: Apr. 2, 2018

(86) PCT No.: PCT/KR2018/003840
§ 371 (c)(1),
(2) Date: Oct. 11, 2019

(87) PCT Pub. No.: WO2018/190547
PCT Pub. Date: Oct. 18, 2018

(65) Prior Publication Data
US 2020/0105287 A1 Apr. 2, 2020

(30) Foreign Application Priority Data
Apr. 14, 2017 (KR) .................. 10-2017-0048574

(51) Int. Cl.
*G10L 21/00* (2013.01)
*G10L 21/02* (2013.01)
(Continued)

(52) U.S. Cl.
CPC ........ *G10L 21/0208* (2013.01); *G06K 9/6256* (2013.01); *G06N 3/04* (2013.01);
(Continued)

(58) Field of Classification Search
CPC ....... G10L 21/0208; G10L 2021/02082; G10L 15/16; G10L 25/30; G10L 15/063; G10L 25/78; G10L 21/02; G10L 17/18
See application file for complete search history.

(56) References Cited

U.S. PATENT DOCUMENTS 10,522,167 B1 * 12/2019 Ayrapetian .......... G10L 21/0264
2009/0310796 A1 * 12/2009 Seydoux ............... H04M 9/082
381/71.1
(Continued)

FOREIGN PATENT DOCUMENTS

JP 2013-037174 A 2/2013
JP 2014-157323 A 8/2014

OTHER PUBLICATIONS

Zhang et al, "Deep neural network-based bottleneck feature and denoising autoencoder-based dereverberation for distant-talking speaker identification",2015, EURASIP Journal on Audio, Speech, and Music Processing, pp. 1-13.*
(Continued)

*Primary Examiner* — Olujimi A Adesanya
(74) *Attorney, Agent, or Firm* — Sughrue Mion, PLLC (57) ABSTRACT

Disclosed is a deep neural network-based method and apparatus for combining noise and echo removal. The deep neural network-based method for combining noise and echo removal according to one embodiment of the present invention may comprise the steps of extracting a feature vector from an audio signal that includes noise and echo; and acquiring a final audio signal from which both noise and echo have been removed, by using a combined nose and echo removal gain estimated by means of the feature vector and deep neural network DNN.

11 Claims, 8 Drawing Sheets

(51) Int. Cl.

| | |
|---|---|
| *G10L 21/0208* | (2013.01) |
| *G06K 9/62* | (2006.01) |
| *G06N 3/04* | (2006.01) |
| *G10L 15/02* | (2006.01) |
| *G10L 15/06* | (2013.01) |
| *G10L 19/028* | (2013.01) |
| *G10L 25/30* | (2013.01) |

(52) U.S. Cl.
CPC ............ *G10L 15/02* (2013.01); *G10L 15/063* (2013.01); *G10L 19/028* (2013.01); *G10L 25/30* (2013.01); *G10L 2021/02082* (2013.01)

(56) References Cited

U.S. PATENT DOCUMENTS

| | | | |
|---|---|---|---|
| 2011/0238416 | A1 | 9/2011 | Seltzer et al. |
| 2014/0257803 | A1 | 9/2014 | Yu et al. |
| 2016/0358602 | A1* | 12/2016 | Krishnaswamy ....... G10L 15/20 |
| 2016/0360372 | A1* | 12/2016 | Chen ..................... H04W 4/80 |
| 2017/0061978 | A1 | 3/2017 | Wang et al. |

OTHER PUBLICATIONS

Zhao et al, "A two-stage algorithm for noisy and reverberant speech enhancement", Mar. 2017 IEEE International Conference on Acoustics, Speech and Signal Processing (ICASSP) Mar. 5, 2017 (pp. 5580-5584). IEEE, pp. 5580-5584.*

Feng et al, "Speech feature denoising and dereverberation via deep autoencoders for noisy reverberant speech recognition" 2014 IEEE international conference on acoustics, speech and signal processing (ICASSP) May 4, 2014 (pp. 1759-1763). IEEE.*

Yun-Sik Park et al., "Integrated acoustic echo and background noise suppression technique based on soft decision", EURASIP Journal on Advances in Signal Processing, Jan. 2012, pp. 1-9.

Chul Min Lee et al., "Enhanced acoustic echo suppression techniques based on spectro-temporal correlations", Creative Commons, Aug. 2016, 119 pages.

Chul Min Lee et al., "DNN-based residual echo suppression", Interspeech 2015, Sep. 6-10, 2015, pp. 1775-1779.

International Search Report for PCT/KR2018/003840 dated Jul. 6, 2018 [PCT/ISA/210].

* cited by examiner

DEEP NEURAL NETWORK-BASED METHOD AND APPARATUS FOR COMBINING NOISE AND ECHO REMOVAL

CROSS REFERENCE TO RELATED APPLICATIONS

This application is a National Stage of International Application No. PCT/KR2018/003840 filed Apr. 2, 2018, claiming priority based on Korean Patent Application No. 10-2017-0048574 filed Apr. 14, 2017.

TECHNICAL FIELD

The following embodiments relates to a technology for integrating and eliminating noise and an echo included in a voice signal based on a deep neural network.

BACKGROUND ART

A technology for integrating and eliminating voice noise and echo is a technology for eliminating noise and an echo included in a voice signal. In general, a noise eliminator and an echo eliminator are independently designed and connected in series to perform noise and echo eliminations sequentially. However, such noise and echo eliminators have a great difference performance depending on the locations of the noise eliminator and the echo eliminator. For example, if the noise eliminator is positioned at the front end of the echo eliminator, performance of the echo eliminator is degraded due to the non-linear computation of the noise eliminator.

Furthermore, if the echo eliminator is positioned at the front end of the noise eliminator, there is a problem in that performance of noise estimation is degraded because the spectrum of noise to be estimated by the noise eliminator is distorted in an echo elimination process.

Accordingly, a noise and echo integration and elimination technology for integrating and eliminating noise and an echo at a time may be used. Conventionally, a noise and echo integration and elimination technology based on a statistical model using statistical information between a voice signal and noise and an echo has been chiefly used, but such a voice enhancement technology based on the statistical model has a problem in that performance is greatly degraded in an abnormal nose environment unlike in a normal nose environment. For example, in voice recognition, performance is reduced if a test is performed based on a signal including noise after a voice recognition model is trained using a clean signal not including noise. In order to solve such a performance reduction, there was proposed a technology for training a voice recognition model using voice including noise. If a test is performed in a noise environment optimized and trained in a trained noise environment, however, excellent performance appears. If a test is performed in an untrained noise environment, however, there is a problem in that performance is degraded.

Recently, a deep neural network (DNN), that is, a machine learning scheme, shows excellent performance in various voice enhancement and voice recognition researches. The DNN shows excellent performance by effectively modeling a non-linear relation between an input feature vector and an output feature vector through multiple hidden layers and hidden nodes.

Korean Patent No. 10-0762596 relates to a voice signal pre-processing system and a voice signal feature information extraction method, and describes a technology for pre-processing a voice signal using a neural network recognition method.

DISCLOSURE

Technical Problem

Embodiments describe a method and apparatus for integrating and eliminating noise and an echo based on a DNN, and more particularly, provide a technology for integrating and eliminating noise and an echo included in a voice using a DNN.

Embodiments provide a method and apparatus for integrating and eliminating noise and an echo based on a DNN, which effectively integrate and eliminate noise and an echo by using noise information and echo information, that is, statistical information of a voice signal, as an additional input to a DNN and using the integrated and eliminated gain of nose and an echo for integrating and eliminating noise and an echo from the voice signal as target feature vectors for the DNN in order to solve a problem in that the DNN is rarely trained using only a far-end speech signal and microphone input information.

Technical Solution

A method of integrating and eliminating noise and an echo based on a DNN according to an embodiment include steps of extracting a feature vector from a voice signal including noise and an echo, and obtaining the final voice signal from which noise and an echo have been integrated and eliminated using an integrated and eliminated gain of nose and an echo estimated through the feature vector and the training of the DNN.

The method further includes the step of training the DNN. The step of training the DNN may include extracting feature vectors from a microphone input signal including noise and an echo and a far-end speech signal in a training stage, and estimating the integrated and eliminated gain of nose and an echo by using the feature vectors as input feature vectors for the DNN and passing the input feature vectors through a weight parameter and bias parameter, that is, a model of the trained DNN.

The step of training the DNN may further include the step of concatenating priori and posteriori signal-to-echo ratios (SERs) and priori and posteriori signal-to-noise ratios (SNRs), that is, statistical information of a voice signal, and the extracted feature vectors and using the concatenated SERs and SNRs and extracted feature vectors as the input feature vectors for the DNN in the training stage.

In the training stage, the step of extracting feature vectors from a microphone input signal including noise and an echo and a far-end speech signal in a training stage may include transforming a signal in a time domain into a signal into a frequency domain by performing a short-time Fourier transform (STFT) on the microphone input signal including noise and an echo and the far-end speech signal in the training stage, and extracting the log power spectrum (LPS) of the transformed signal in the frequency domain as the feature vector.

The step of training the DNN may include estimating continuous optimal gains through a regression of the DNN, and performing the training of the DNN in such a manner that a difference between an integrated and eliminated gain of nose and an echo, which is a target feature vector, and an integrated and eliminated gain of nose and an echo estimated through the DNN is minimized using a mean squared error (MSE) as an object function of the DNN.

The step of extracting a feature vector from a voice signal including noise and an echo may include the steps of extracting feature vectors from a microphone input signal including noise and an echo and a far-end speech signal in a voice enhancement stage, and concatenating priori and priori and posteriori signal-to-echo ratios (SERs) and priori and posteriori signal-to-noise ratios (SNRs), that is, statistical information of a voice signal, and the extracted feature vectors and using the concatenated SERs and SNRs and extracted feature vectors as input feature vectors for the DNN in the voice enhancement stage.

In the voice enhancement stage, the step of extracting feature vectors from a microphone input signal including noise and an echo and a far-end speech signal may include transforming a signal in a time domain into a signal in a frequency domain by performing a short-time Fourier transform (STFT) on the microphone input signal including noise and an echo and the far-end speech signal in the voice enhancement stage, and extracting the log power spectrum (LPS) of the transformed signal in the frequency domain as the feature vector.

The step of obtaining the final voice signal from which noise and an echo have been integrated and eliminated using an integrated and eliminated gain of nose and an echo estimated through the feature vector and the training of the DNN may include the steps of obtaining the log power spectrum (LPS) of a near-end speech signal by multiplying an LPS of the microphone input signal including noise and an echo by the estimated integrated and eliminated gain of nose and an echo, and obtaining a waveform of the final near-end speech signal from which noise and an echo have been finally eliminated by performing an inverse short-time Fourier transform (ISTFT) on the LPS of the near-end speech signal along with a phase of a signal including noise and an echo.

An apparatus for integrating and eliminating noise and an echo based on a DNN according to another embodiment may include a feature vector extraction unit for extracting a feature vector from a voice signal including noise and an echo, and a voice signal reconstruction unit for obtaining the final voice signal from which noise and an echo have been integrated and eliminated using an integrated and eliminated gain of nose and an echo estimated through the feature vector and the training of the DNN.

The apparatus further includes a DNN training unit for training the DNN. The DNN training unit may include a feature vector extraction unit of the training unit for extracting feature vectors from a microphone input signal including noise and an echo and a far-end speech signal in a training stage, and a DNN modeling unit for estimating the integrated and eliminated gain of nose and an echo by using the feature vectors as input feature vectors for the DNN and passing the input feature vectors through a weight parameter and bias parameter, that is, a model of the trained DNN.

The feature vector extraction unit of the training unit may include a noise and echo information unit of the training unit for concatenating priori and posteriori signal-to-echo ratios (SERs) and priori and posteriori signal-to-noise ratios (SNRs), that is, statistical information of a voice signal, and the extracted feature vectors and using the concatenated SERs and SNRs and extracted feature vectors as the input feature vectors for the DNN in the training stage.

The feature vector extraction unit of the training unit may include a spectrum extraction unit of the training unit for transforming a signal in a time domain into a signal into a frequency domain by performing a short-time Fourier transform (STFT) on the microphone input signal including noise and an echo and the far-end speech signal in the training stage and for extracting the log power spectrum (LPS) of the transformed signal in the frequency domain as the feature vector.

The DNN modeling unit may estimate continuous optimal gains through a regression of the DNN, and performs the training of the DNN in such a manner that a difference between an integrated and eliminated gain of nose and an echo, which is a target feature vector, and an integrated and eliminated gain of nose and an echo estimated through the DNN is minimized using a mean squared error (MSE) as an object function of the DNN.

The feature vector extraction unit may include a spectrum extraction unit for transforming a signal in a time domain into a signal in a frequency domain by performing a short-time Fourier transform (STFT) on the microphone input signal including noise and an echo and the far-end speech signal in the voice enhancement stage, and a noise and echo information unit for concatenating priori and priori and posteriori signal-to-echo ratios (SERs) and priori and posteriori signal-to-noise ratios (SNRs), that is, statistical information of a voice signal, and the extracted feature vectors and using the concatenated SERs and SNRs and extracted feature vectors as input feature vectors for the DNN in the voice enhancement stage.

The voice signal reconstruction unit may obtain the log power spectrum (LPS) of a near-end speech signal by multiplying an LPS of the microphone input signal including noise and an echo by the estimated integrated and eliminated gain of nose and an echo, and may obtain a waveform of the final near-end speech signal from which noise and an echo have been finally eliminated by performing an inverse short-time Fourier transform (ISTFT) on the LPS of the near-end speech signal along with a phase of a signal including noise and an echo.

Advantageous Effects

In accordance with embodiments, there can be provided the method and apparatus for integrating and eliminating noise and an echo based on a DNN, which effectively integrate and eliminate noise and an echo by using noise information and echo information, that is, statistical information of a voice signal, as an additional input to a DNN and using the integrated and eliminated gain of nose and an echo for integrating and eliminating noise and an echo from the voice signal as target feature vector for the DNN in order to solve a problem in that the DNN is rarely trained using only a far-end speech signal and microphone input information.

MODE FOR INVENTION

Hereinafter, embodiments are described in detail with reference to the accompanying drawings. However, the described embodiments may be modified in various other forms, and the scope of the present invention is not restricted by the following embodiments. Furthermore, various embodiments are provided to fully describe the present invention to a person having ordinary knowledge in the art to which the present invention pertains. The shape, size, etc. of elements in the drawings may be exaggerated for a clear description.

A voice enhancement technology is a technology for estimating a clean voice by eliminating noise and an echo from a voice signal which is input to a microphone and includes noise and an echo, and is a technology essential to a voice application for voice recognition and voice communication. For example, in voice recognition, performance is reduced if a test is performed based on a signal including noise after a voice recognition model is trained based on a clean signal not including noise and an echo. In order to solve this problem, performance of voice recognition can be improved by introducing a voice enhancement technology for eliminating noise and an echo before the voice recognition is performed. Furthermore, the voice enhancement technology may also be used to improve call quality by eliminating noise and an echo in voice communication and transmitting a voice sharply and clearly.

The following embodiments can integrate and eliminate noise and an echo included in a voice using a deep neural network (DNN). More particularly, in the embodiments, in order to solve a problem in that a DNN is rarely trained using only a far-end speech signal and microphone input information, priori and posteriori signal-to-echo ratios (SERs) and priori and posteriori signal-to-noise ratios (SNRs), that is, statistical information of a voice signal, are used as additional inputs to the DNN, the integrated and eliminated gain of nose and an echo obtaining by integrating and eliminating noise and an echo from a voice signal is used as target feature vector for the DNN. Accordingly, noise and an echo can be effectively integrated and eliminated.

In the present embodiments, a case where a short time Fourier transform (SIFT) and an inverse short time Fourier transform (ISTFT) are used is described as an example, but this corresponds to an embodiment. A discrete Fourier transform (DFT), an inverse discrete Fourier transform (IDFT), a fast Fourier transform (FFT), or an inverse fast Fourier transform (IFFT) may be use d in addition to the STFT and the ISTFT.

A technology for integrating and eliminating noise and an echo included in a voice signal based on a DNN is described more specifically below.

Figure 1:
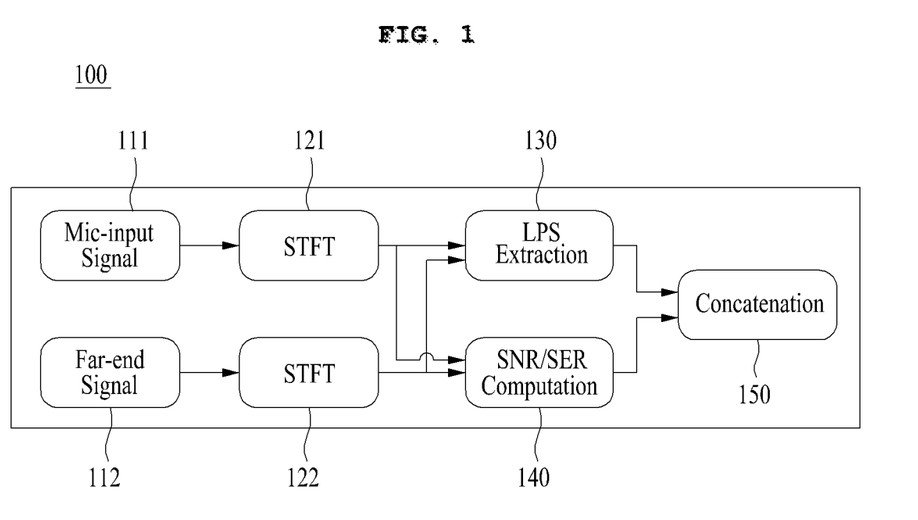
FIG. 1 is a diagram for illustrating the extraction of feature vectors by an apparatus for integrating and eliminating noise and an echo based on a DNN according to an embodiment.

FIG. 1 is a diagram for illustrating the extraction of feature vectors by an apparatus for integrating and eliminating noise and an echo based on a DNN according to an embodiment.

Referring to FIG. 1, the feature vector extraction apparatus 100 for integrating and eliminating noise and an echo based on a DNN may receive a microphone input (Mic-input) signal 111 and a far-end signal 112 for the extraction of feature vectors for integrating and eliminating noise and an echo.

The microphone input signal 111 may be transformed through an STFT 121 and represented as a signal in a frequency domain. Accordingly, for the extraction of input feature vectors, the log power spectrum (LPS) of the frequency domain signal may be extracted. That is, the LPS of the microphone input signal 111 may be extracted (130) and used as an input feature vector for a DNN.

Furthermore, the far-end signal 112 may be transformed through an STFT 122 and represented as a signal in a frequency domain. Accordingly, for the extraction of an input feature vector, the LPS of the frequency domain signal may be extracted. That is, the LPS of the far-end signal 112 may be extracted (130) and used as an input feature vector for the DNN.

Additional echo information (reverberation information) and noise information 140 for performance improvement may be concatenated and used (150) as the input to the DNN in addition to the LPS of the microphone input signal and the LPS of the far-end speech signal.

In the following embodiments, an optimal integrated and eliminated gain of nose and an echo can be estimated by introducing an algorithm for integrating and eliminating noise and an echo into a DNN. Furthermore, noise and echo elimination performance based on a DNN can be improved using priori and posteriori SERs and priori and posteriori SNRs, that is, additional noise and echo information, as inputs to the DNN.

First, a method of extracting feature vectors is described more particularly with reference to Equations 1 to 6.

A microphone input signal (microphone input power) y(t) including noise and an echo may be generated by adding a noise signal (noise power) d(t) and an echo signal (echo power) e(t) to a near-end speech signal (near-end speech power) x(t), and may be represented like the following equation. In this case, the microphone input signal including noise and an echo means a microphone input signal including both noise and echo.

$$y(t)=x(t)+d(t)+e(t) \qquad \text{[Equation 1]}$$

As in Equation 1, the microphone input signal y(t) including noise and an echo may be transformed through a short-time Fourier transform (STFT), and the signal in a time domain may be represented as a signal in a frequency domain. The signal in the frequency domain may be represented like the following equation.

$$Y(l,m)=X(l,m)+D(l,m)+E(l,m) \qquad \text{[Equation 2]}$$

In this case, Y(l,m) may indicate microphone input signal including noise and an echo, X(l,m) may indicate a near-end speech signal, D(l,m) may indicate a noise signal, and E(l,m) may indicate the STFT coefficient of an echo signal. Furthermore, 1 may indicate a frequency index, and m may indicate a frame index.

In Equation 2, the microphone input signal Y(l,m) including noise and an echo represented in the frequency domain may be represented as a spectrum and phase. That is, in the frequency domain, the microphone input signal Y(l,m)

including noise and an echo may be represented as a spectrum and phase like the following equation.

$$Y(l,m) = \sum_{t=0}^{N-1} y(mL+t)w(t)e^{-j\frac{2\pi l}{N}t} \quad \text{[Equation 3]}$$
$$= |Y(l,m)|e^{-j\theta Y(l,m)}$$

In this case, θ may indicate a phase value, and L may indicate a frame step.

The phase of the microphone input signal including noise and an echo may be used to reconstruct a signal to a signal in the time domain in a voice composition step. For the extraction of an input feature vector, the log power spectrum or log power spectra (LPS) of the frequency domain signal may be extracted. Accordingly, the LPS obtained by taking a log computation value in the voice spectrum feature vector of Equation 3 may be used as an input feature vector. For example, the LPS may be computed by taking a log in a size (|Y(l,m)|).

Additional echo information and noise information for performance improvement may be concatenated and used as inputs to a DNN in addition to the LPS of a microphone input signal and the LPS of a far-end speech signal. A priori signal-to-echo ratio and posteriori signal-to-echo ratio (priori and posteriori SERs) may be used as the additional echo information, and a priori signal-to-noise ratio and posteriori signal-to-noise ratio (priori and posteriori SNRs) may be used as the additional noise information. The priori SER, posteriori SER, priori SNR, and posteriori SNR indicative of the additional echo and noise information may be sequentially represented like the following equations.

$$\xi_e(i,k) \equiv \frac{|\hat{E}(i,k)|^2}{\lambda_E} \quad \text{[Equation 4]}$$

$$\gamma_e(i,k) \equiv \frac{|Y(i,k)|^2}{\lambda_E}$$

$$\xi_n(i,k) \equiv \frac{|\tilde{E}(i,k)|^2}{\lambda_D}$$

$$\gamma_n(i,k) \equiv \frac{|Y(i,k)|^2}{\lambda_D}$$

In this case, Y(i,k) may indicate a microphone input signal, Ê(i,k) may indicate a signal from which acoustic echo was eliminated, Ẽ(i,k) may indicate a signal from which background noise was eliminated, may indicate power of an echo signal, and λD may indicate power of a noise signal.

Table 1 illustrates additional noise information and echo information.

TABLE 1

| A posteriori SER | A priori SER |
|---|---|
| $\dfrac{\text{Microphone signal power}}{\text{Echo power}}$ | $\dfrac{\text{Near-end speech power}}{\text{Echo power}}$ |
| $\gamma(i,k) = \dfrac{|Y(i,k)|^2}{\lambda_d(i,k)}$ | $\zeta(i,k) = \dfrac{\lambda_s(i,k)}{\lambda_d(i,k)}$ |

TABLE 1-continued

| A posteriori SNR | A priori SNR |
|---|---|
| $\dfrac{\text{Microphone signal power}}{\text{Noise power}}$ | $\dfrac{\text{Enhanced power}}{\text{Noise power}}$ |
| $\gamma(i,k) = \dfrac{|Y(i,k)|^2}{\lambda_n(i,k)}$ | $\zeta(i,k) = \dfrac{\lambda_s(i,k)}{\lambda_n(i,k)}$ |

The priori and posteriori SERs and priori and posteriori SNRs, that is, the additional noise information and echo information, may be illustrated as in Table 1. Such priori and posteriori SERs and priori and posteriori SNRs, that is, the additional noise information and echo information, may be estimated from the existing statistics-based integration and elimination.

For example, the posteriori SNR may be updated using a disperse value of a noise signal in the section in which voice is not present. The priori SNR may be computed using a decision-directed method in the section in which voice is present. Likewise, the posteriori SER may be updated using a disperse value of an echo signal in the section in which voice is not present. The priori SER may be computed using a decision-directed method in the section in which voice is present.

Accordingly, a total of 6682 obtained by concatenating the priori and posteriori SERs and priori and posteriori SNRs, that is, the LPS of the microphone input signal, the LPS of the far-end speech signal, the additional echo information, and the additional noise information, may be used as input feature vectors for a DNN.

An optimal gain value for integrating and eliminating an acoustic reverberation (echo) and background noise may be estimated as a target feature vector for the DNN. The optimal gain $G_{opt}$ may be represented like the following equation.

$$G_{opt}(i,k) = \max\left\{\min\left(1, \frac{|S(i,k)|}{|Y(i,k)|}\right), G_{min}\right\} \quad \text{[Equation 5]}$$

In this case, S(n,i) may mean the STFT coefficient of a clean near-end speech signal, and Y(n,i) may mean the STFT coefficient of a microphone input signal. In this case, a value of $G_{min}$ may be set to $10_{-4}$.

The training of the DNN may be first performed in order to integrate and eliminate noise and an echo based on the DNN.

In a method of integrating and eliminating noise and an echo based on a DNN, an optimal gain for integrating and eliminating noise and an echo may be estimated by training the DNN using the spectrum of a microphone input signal, the spectrum of a far-end speech signal, additional noise information, and additional echo information as input feature vectors.

The DNN may estimate continuous optimal gain values through the regression of the DNN. The training of the DNN may be performed in such a manner that a difference between the integrated and eliminated gain of nose and an echo, that is, a target feature vector, and the integrated and eliminated gain of nose and an echo estimated through the DNN is minimized using a mean squared error (MSE) as an object function of the DNN. In this case, the MSE may be represented like the following equation.

$$MSE = \frac{1}{n}\sum_{i=1}^{n}(\hat{Y}_i - Y_i)^2 \quad \text{[Equation 6]}$$

In this case, n may indicate a total number of training data samples. $Y_i$ may indicate the LPS of a clean voice signal not including noise and an echo, that is, a target feature vector for the DNN. $\hat{Y}_i$ may indicate the LPS of a signal from which noise and an echo were integrated and eliminated through the voice enhancement of the DNN.

The DNN is capable of the modeling of a non-linear feature through multiple hidden layers and hidden nodes. When the training of the DNN is completed, a weight parameter and bias parameter, that is, a model trained through the DNN, may be used for the integration and elimination of noise and an echo.

When the training of the DNN is completed, the integration and elimination step (test step) of noise and an echo may be performed.

In the integration and elimination step of noise and an echo, in order to integrate and eliminate noise and an echo, input feature vectors may be extracted from a microphone input signal and a far-end speech signal, that is, signals from which noise and an echo will be integrated and eliminated. In this case, the input feature vectors may be generated by concatenating priori and posteriori SERs and priori and posteriori SNRs, that is, the LPSs of the microphone input signal and far-end speech signal, additional noise information, and additional echo information.

In the training stage of the DNN, the integrated and eliminated gain of nose and an echo may be obtained by passing the input feature vectors through a weight parameter and a bias parameter, that is, a model of the trained DNN. An estimated spectrum of the near-end speech signal may be obtained by multiplying the spectrum of the microphone input signal by the integrated and eliminated gain of nose and an echo. The waveform of the finally estimated clean near-end speech signal may be obtained by performing an inverse short-time Fourier transform (ISTFT) on the phase of the signal including noise along with the estimated LPS of the clean near-end speech signal. The phase of a voice signal including noise may be used as a phase without any change because a person's auditory sense is not greatly influenced by a phase.

Figure 2:
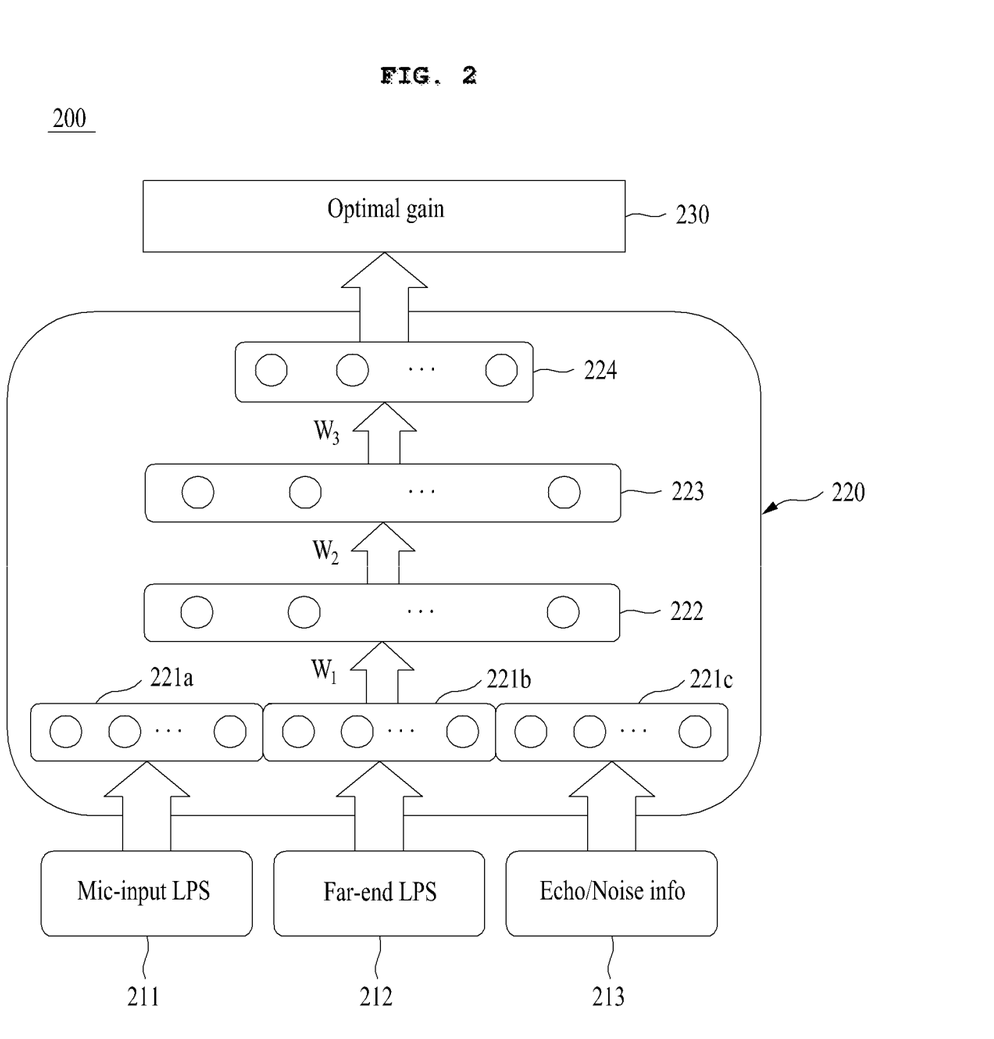
FIG. 2 is a diagram for illustrating an optimal gain of the apparatus for integrating and eliminating noise and an echo based on a DNN according to an embodiment.

FIG. 2 is a diagram for illustrating an optimal gain of the apparatus for integrating and eliminating noise and an echo based on a DNN according to an embodiment.

Hereinafter, signals signal-processed in a trained noise environment and untrained noise environment are compared and a difference between the signals is described with reference to FIG. 2. In this case, performance may be compared based on a voice waveform in a time domain, perceptual evaluation of speech quality (PESQ), that is, an objective voice evaluation method, and echo return loss enhancement (ERLE) for measuring the degree that an echo has been eliminated.

For performance comparison experiments, a reverberation environment voice may be generated in 4620 TIMIT voice databases using a room impulse response generator. A simulation space may be configured, and a reverberation environment may be configured by setting reverberation times to 0.1 s, 0.2 s, and 0.3 s. A microphone input signal may be obtained by combining a far-end speech signal and a near-end speech signal. An acoustic reverberation signal in the microphone input signal may be set to be lower than the near-end speech signal by an average of 3.5 dB. For a noise environment configuration, four types of noise, such as Babble, Factory, HF channel, and F16 of NOISEX-92, may be added to a training data set. Eight types of noise, such as Babble, Factory, HF channel, F16, Destroyer-engine, Buccaneer, Pink, and White, may be added to a test data set as a signal-to-noise ratio (SNR) of 10 dB.

After the microphone input signal, the far-end speech signal, and a clean near-end speech signal, that is, a target feature vector for a DNN, are zero-padded using a frame size 320 sample (20 ms) and delay 80 samples, a signal in a frequency domain may be obtained by performing a 512-point STFT. In this case, the log power spectrum (LPS) of the frequency domain signal was used as a feature vector. That is, the LPS of a microphone input (Mic-input) signal 211 and the LPS of a far-end speech signal 212 may be used as input feature vectors for the DNN.

Furthermore, in a noise elimination algorithm based on a voice statistical model and an echo elimination step based on a voice statistical model, the priori and posteriori SERs and the priori and posteriori SNRs, that is, additional echo and noise information 213, were computed. In this case, a total of 6682 dimensions were used as input feature vectors for the DNN by concatenating the current frame of the LPS of the microphone input signal and 5 frames before and after the current frame, 5 frames before and after the LPS of the far-end speech signal, and the priori and posteriori SERs and priori and posteriori SNRs, that is, the additional echo and noise information 213.

Furthermore, a total of 257 dimensions were used as an optimal gain 230 for integrating and eliminating an acoustic echo and background noise as a target feature vector for the DNN. A DNN 220 may be configured with a plurality of layers. For example, the DNN may be configured with three layers 222, 223, and 224. Each of the three layers is configured with 1024 hidden units. A sigmoid active function was used as the active function of the DNN 220. In the regression of the DNN 220, training was performed in a back-propagation (BP) form through a stochastic gradient descent (SGD) using a minimum mean squared error (MMSE) as an object function and 100 as the size of a mini-batch. All types of training were performed up to an epoch 50. After the training was performed at a constant learning rate up to an epoch 20, the learning rate was decreased at a ratio of 0.9 from an epoch 21. An optimal integrated and eliminated gain of nose and an echo may be estimated by introducing the algorithm for integrating and eliminating noise and an echo into the DNN.

As the results of the experiments, the technology for integrating and eliminating noise and an echo based on the DNN according to an embodiment had more excellent performance than a technology for integrating and eliminating noise and an echo based on the existing statistical model in both a trained noise environment and untrained noise environment through the DNN which is robust against the modeling of a non-linear property having a high-dimensional vector using multiple hidden layers and hidden nodes.

Figure 3:
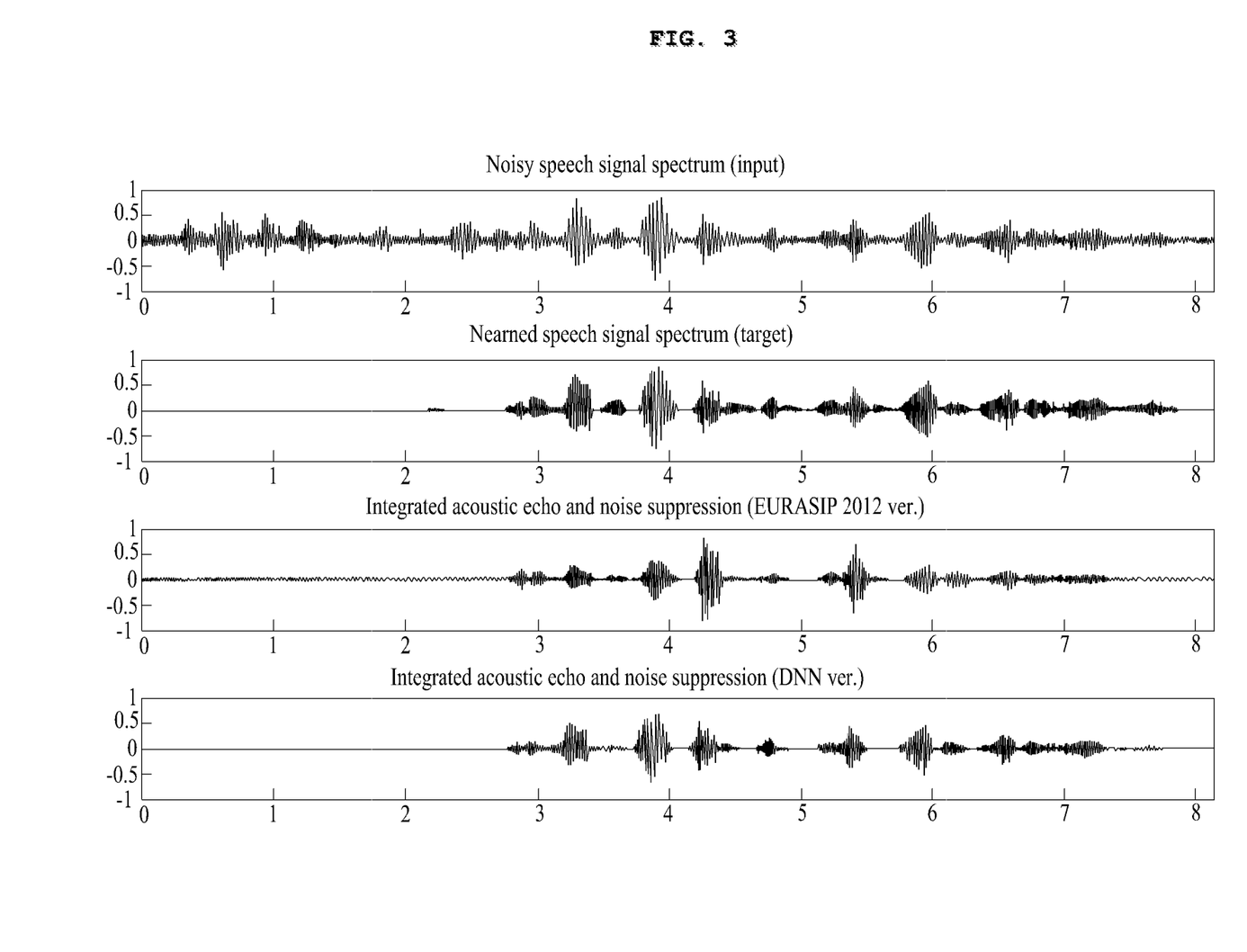
FIG. 3 illustrates a comparison between the waveforms of signals from which noise and an echo have been eliminated in a trained noise environment according to an embodiment.
Figure 4:
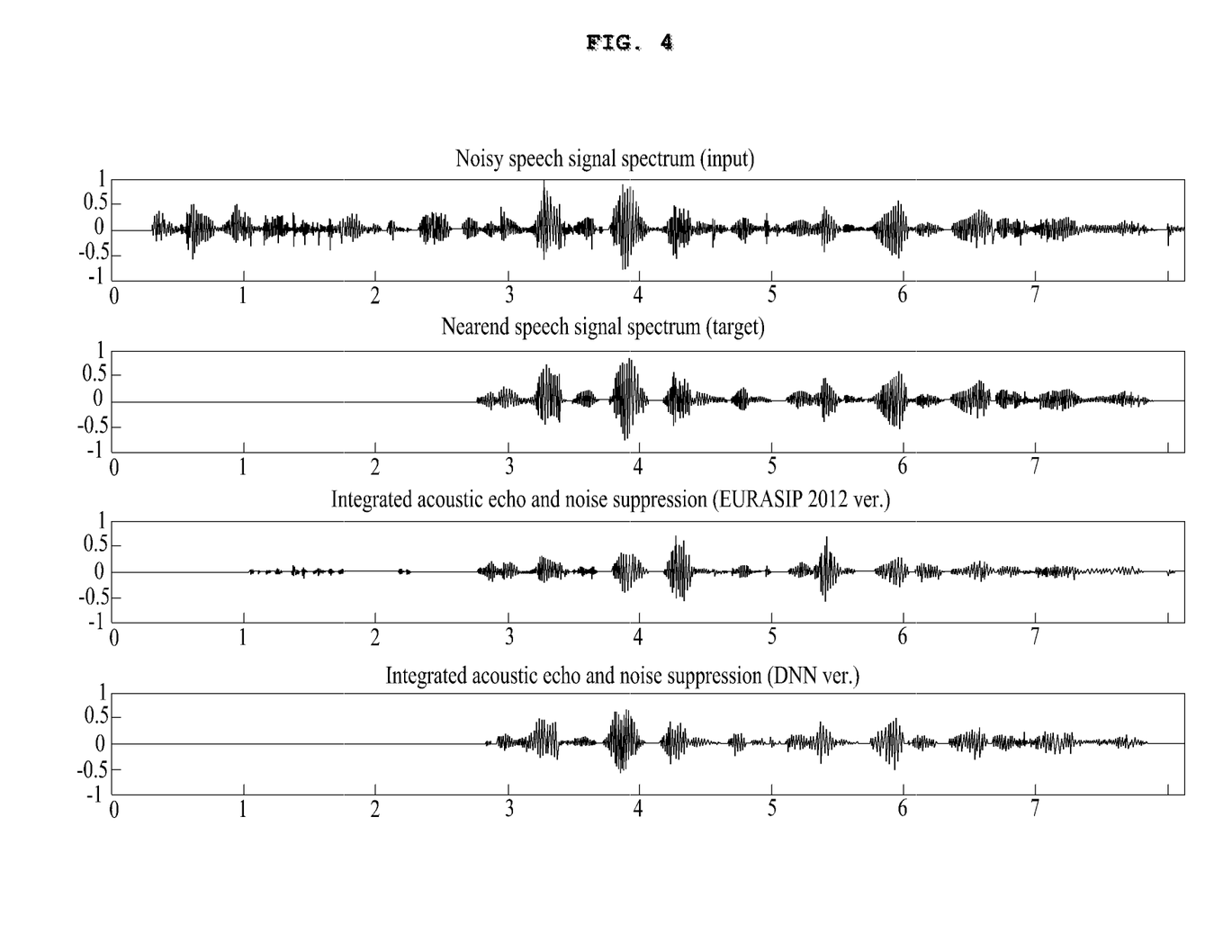
FIG. 4 illustrates a comparison between the waveforms of signals from which noise and an echo have been eliminated in an untrained noise environment for a comparison with a trained noise environment according to an embodiment.

FIG. 3 illustrates a comparison between the waveforms of signals from which noise and an echo have been eliminated in a trained noise environment according to an embodiment. Furthermore, FIG. 4 illustrates a comparison between the waveforms of signals from which noise and an echo have been eliminated in an untrained noise environment for a comparison with a trained noise environment according to an embodiment.

FIG. 3 illustrates a comparison between the waveforms of signals from which noise and an echo have been eliminated in a factory 10 dB (RT60: 0.1 s) of a trained noise environment. FIG. 4 illustrates a comparison between the waveforms of signals from which noise and an echo have been eliminated in machinegun 10 dB (RT60: 0.1 s) of an untrained noise environment. FIGS. 3 and 4 illustrate the waveforms of signals from which noise and an echo have been eliminated in the factory 10 dB of a trained noise environment and the machinegun 10 dB (RT60: 0.1 s) of an untrained noise environment.

It can be seen that in the method of integrating and eliminating noise and an echo based on a DNN according to an embodiment, higher echo elimination performance is achieved in the far-end speech section and a near-end speech signal is better preserved in the near-end speech section, compared to the existing statistical model.

Table 2 illustrates an ERLE comparison in the far-end speech section.

TABLE 2

|  |  | EURASIP 2012 ver. | DNN ver. |
|---|---|---|---|
| Seen noise | Babble | 18.0 | 46.7 |
|  | Factory | 18.1 | 46.3 |
|  | Hfchannel | 24.3 | 47.0 |
|  | F16 | 19.9 | 47.0 |
| Unseen noise | Volvo | 12.6 | 46.7 |
|  | Leopard | 16.1 | 47.0 |
|  | Buccaneer | 20.1 | 46.5 |
|  | Destroyer engine | 22.5 | 46.7 |
|  | White | 25.6 | 41.1 |
|  | Machine gun | 18.4 | 39.6 |
|  | Pink | 19.4 | 45.6 |

Furthermore, Table 3 illustrates an PESQ comparison in the near-end speech section.

TABLE 3

|  |  | Mic input | EURASIP 2012 ver. | DNN ver. |
|---|---|---|---|---|
| Seen noise | Babble | 1.87 | 2.08 | 2.26 |
|  | Factory | 1.68 | 1.91 | 2.27 |
|  | Hfchannel | 1.47 | 1.95 | 2.32 |
|  | F16 | 1.79 | 1.98 | 2.31 |
| Unseen noise | Volvo | 2.94 | 3.13 | 3.17 |
|  | Leopard | 2.52 | 2.71 | 2.74 |
|  | Buccaneer | 1.67 | 2.04 | 2.30 |
|  | Destroyer engine | 1.77 | 2.03 | 2.29 |
|  | White | 1.78 | 2.33 | 2.43 |
|  | Machine gun | 2.52 | 2.54 | 2.68 |
|  | Pink | 1.70 | 2.08 | 2.39 |

According to Table 2 and Table 3, an ERLE value for measuring the degree that an echo has been eliminated in the far-end speech section may be compared with PESQ, that is, a voice quality measurement criterion, in the near-end speech section. It can be seen that the noise and echo elimination technology based on a DNN shows higher echo elimination performance and shows higher PESQ results because voice quality of the near-end speech signal is better preserved, compared to the existing statistical model.

Recently, voice recognition based on a DNN is performed in various IoT devices. In order to improve performance of the voice recognition by eliminating noise and an echo prior to the voice recognition, noise and echo elimination based on a DNN may be performed, and thus voice quality can be improved by application to various voice communication technologies.

Figure 5:
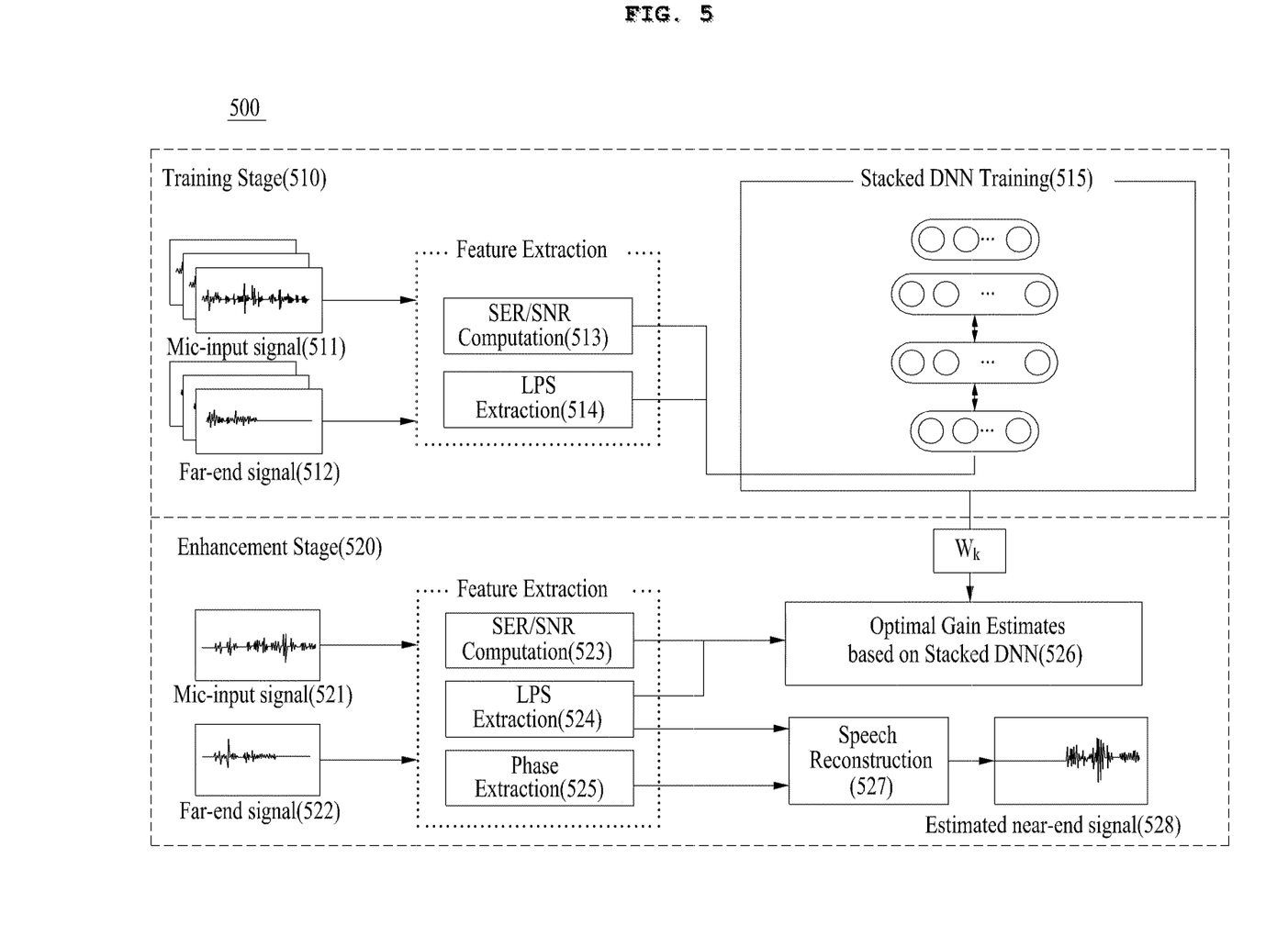
FIG. 5 is a diagram for illustrating the apparatus for integrating and eliminating noise and an echo based on a DNN according to an embodiment.

FIG. 5 is a diagram for illustrating the apparatus for integrating and eliminating noise and an echo based on a DNN according to an embodiment.

Referring to FIG. 5, in the present embodiment, a technology for integrating and eliminating noise and an echo based on a DNN may be divided into a training stage 510 and a voice enhancement stage 520.

First, in the training stage 510, feature vectors may be extracted (513, 514) using a training data set of a microphone input signal 511 including noise and an echo and a far-end speech signal 512. In this case, the LPSs of the microphone input signal 511 and the far-end speech signal 512 and SERs and SNRs, that is, statistical information of the signals may be used as the feature vectors. Training may be performed (515) to estimate the integrated and eliminated gain of nose and an echo through the DNN based on the feature vectors.

Next, the voice enhancement stage 520 may be performed. Like the training stage 510, the voice enhancement stage 520 may also start from the extraction of feature vectors (523, 524 and 525). After LPSs and SERs and SNRs, that is, statistical information of a microphone input signal 521 including noise and an echo and a far-end speech signal 522, are extracted based on a training data set of the signals, they may be concatenated and used as input feature vectors. Furthermore, a phase may be extracted based on a training data set of the microphone input signal 521 including noise and an echo and the far-end speech signal 522.

The finally estimated integrated and eliminated gain of nose and an echo may be obtained by passing the input feature vectors through a weight parameter and a bias parameter, that is, a model trained in the training process of a DNN (526).

Furthermore, the waveform of a clean near-end speech signal from which noise and an echo have been finally eliminated may be obtained (528) through a process (527) of reconstructing a voice along with the phase of the microphone input signal based on the LPS of the clean near-end speech signal estimated by multiplying the estimated integrated and eliminated gain of nose and an echo by the LPS of the microphone input signal.

Hereinafter, an apparatus for integrating and eliminating noise and an echo based on a DNN according to an embodiment is described more particularly as an example.

Figure 6:
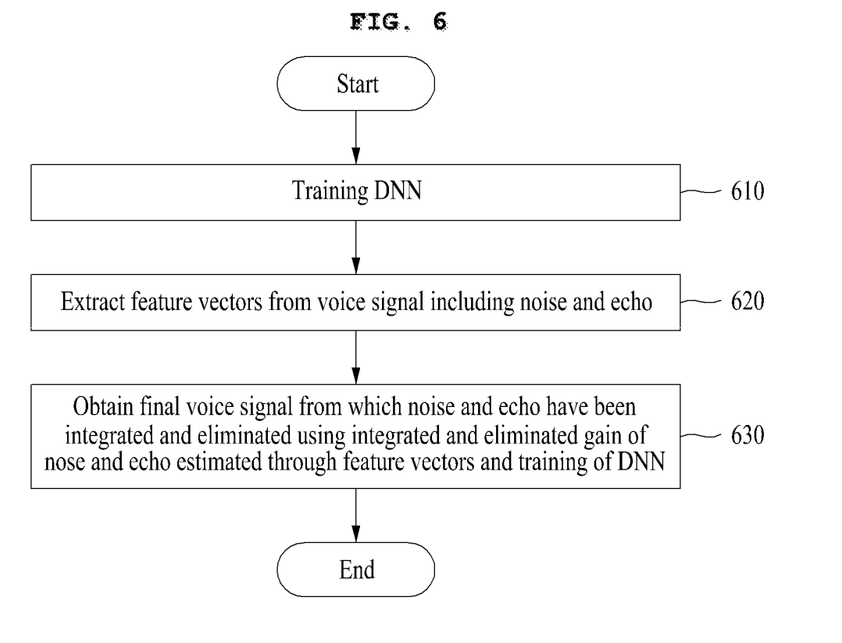
FIG. 6 is a flowchart illustrating a method of integrating and eliminating noise and an echo based on a DNN according to an embodiment.

FIG. 6 is a flowchart illustrating a method of integrating and eliminating noise and an echo based on a DNN according to an embodiment. Furthermore, FIG. 7 is a flowchart illustrating a method of training a DNN according to an embodiment.

Figure 7:
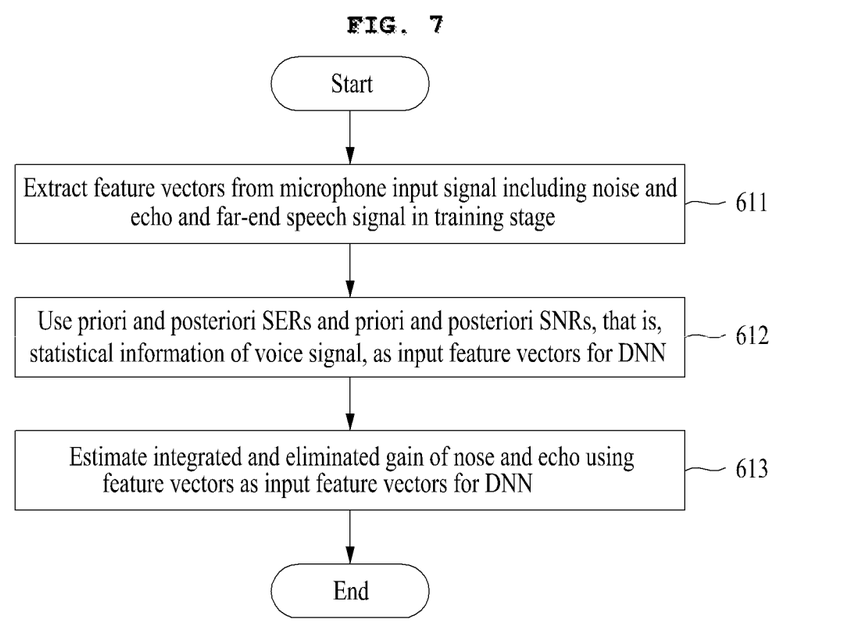
FIG. 7 is a flowchart illustrating a method of training a DNN according to an embodiment.

Referring to FIGS. 6 and 7, the method of integrating and eliminating noise and an echo based on a DNN according to an embodiment may include the step 620 of extracting feature vectors from a voice signal including noise and an echo and the step 630 of obtaining the final voice signal from which noise and an echo have been integrated and eliminated using the feature vectors and the integrated and eliminated gain of nose and an echo trained through the training of a DNN.

The method further includes the step 610 of training the DNN. The step 610 of training the DNN may include the step 611 of extracting the feature vectors from a microphone input signal including noise and an echo and a far-end speech signal in the training stage, and the step 613 of estimating the integrated and eliminated gain of nose and an echo by using the feature vectors as input feature vectors for the DNN and passing the input feature vectors through a weight parameter and bias parameter, that is, a model of the trained DNN.

The step of training the DNN may further include the step 612 of using priori and posteriori SERs and priori and posteriori SNRs, that is, statistical information of the voice signal, as the input feature vectors for the DNN by concatenating the priori and posteriori SERs and the priori and posteriori SNRs to the extracted feature vectors in the training stage.

According to embodiments, in order to solve a problem in that a DNN is rarely trained using only a far-end speech signal and microphone input information, noise information and echo information, that is, statistical information of a voice signal, may be used as additional inputs to the DNN, and the integrated and eliminated gain of nose and an echo for integrating and eliminating noise and an echo from the voice signal may be used as a target feature vector for the DNN. Accordingly, noise and an echo can be effectively integrated and eliminated.

Figure 8:
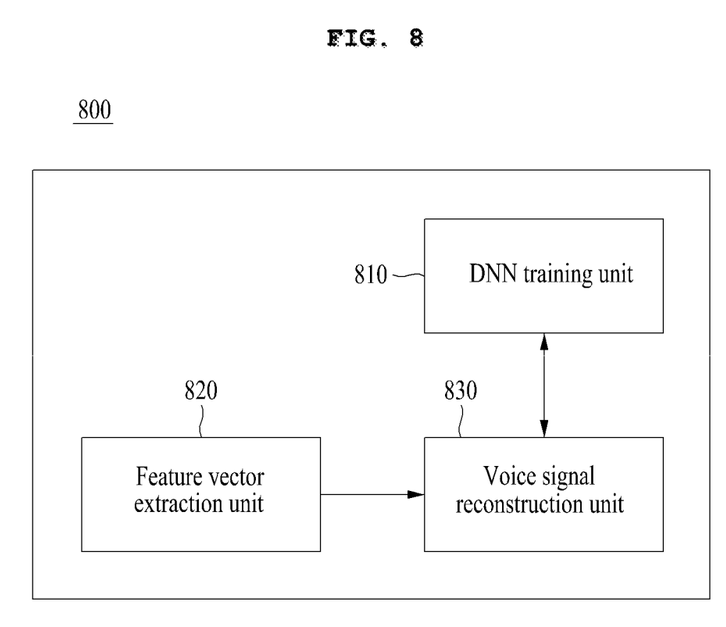
FIG. 8 is a block diagram showing the apparatus for integrating and eliminating noise and an echo based on a DNN according to an embodiment.

FIG. 8 is a block diagram showing the apparatus for integrating and eliminating noise and an echo based on a DNN according to an embodiment.

Referring to FIG. 8, the method of integrating and eliminating noise and an echo based on a DNN according to an embodiment in FIGS. 6 and 7 may be described more particularly using the apparatus for integrating and eliminating noise and an echo based on a DNN according to an embodiment.

The apparatus for integrating and eliminating noise and an echo based on a DNN according to an embodiment may include a DNN training unit 810, a feature vector extraction unit 820, and a voice signal reconstruction unit 830. In this case, the DNN training unit 810 may include the feature vector extraction unit 811 and DNN modeling unit 812 of the training unit. The feature vector extraction unit 811 of the training unit may include the spectrum extraction unit of the training unit and the noise and echo information unit of the training unit. Furthermore, the feature vector extraction unit 820 may include a spectrum extraction unit and a noise and echo information unit.

In the step 610, the DNN training unit 810 may train a DNN.

More particularly, in the step 611, the feature vector extraction unit 811 of the training unit may extract feature vectors from a microphone input signal including noise and an echo and a far-end speech signal in the training stage.

Furthermore, in the step 612, the feature vector extraction unit 811 of the training unit may concatenate priori and posteriori SERs and priori and posteriori SNRs, that is, statistical information of the voice signal, and the extracted feature vectors in the training stage, and may use them as input feature vectors for the DNN.

In this case, the feature vector extraction unit 811 of the training unit may include the spectrum extraction unit of the training unit and the noise and echo information unit of the training unit.

The spectrum extraction unit of the training unit may transform a signal in a time domain into a signal in a frequency domain by performing a short-time Fourier transform (STFT) on the microphone input signal including noise and an echo and the far-end speech signal, and may extract the log power spectrum (LPS) of the transformed signal in the frequency domain as a feature vector in the training stage.

Furthermore, the noise and echo information unit of the training unit may concatenate priori and posteriori SERs and priori and posteriori SNRs, that is, statistical information of the voice signal, and the extracted feature vectors in the training stage, and may use them as input feature vectors for the DNN.

In the step 613, the DNN modeling unit 812 may estimate the integrated and eliminated gain of nose and an echo by using the feature vectors as input feature vectors for the DNN and passing the input feature vectors through a weight parameter and bias parameter, that is, a model of the trained DNN.

The DNN modeling unit may estimate continuous optimal gains through the regression of the DNN. The training of the DNN may be performed in such a manner that a difference between the integrated and eliminated gain of nose and an echo, that is, a target feature vector, and the integrated and eliminated gain of nose and an echo estimated through the DNN is minimized using a mean squared error (MSE) as an object function of the DNN.

In the step 620, the feature vector extraction unit 820 may extract feature vectors from the voice signal including noise and an echo.

In this case, the feature vector extraction unit 820 may include the spectrum extraction unit and the noise and echo information unit.

The spectrum extraction unit may transform a signal in a time domain into a signal in a frequency domain by performing a short-time Fourier transform (STFT) on the microphone input signal including noise and an echo and the far-end speech signal in the voice enhancement stage, and may extract the log power spectrum (LPS) of the transformed signal in the frequency domain as a feature vector.

Furthermore, the noise and echo information unit may concatenate priori and posteriori SERs and priori and posteriori SNRs, that is, statistical information of the voice signal, and the extracted feature vector in the voice enhancement stage, and may use then as input feature vectors for the DNN.

In the step 630, the voice signal reconstruction unit 830 may obtain the final voice signal from which noise and an echo have been integrated and eliminated using the integrated and eliminated gain of nose and an echo estimated through the feature vectors and the training of the DNN.

The voice signal reconstruction unit 830 may obtain the estimated log power spectrum (LPS) of the near-end speech signal by multiplying the LPS of the microphone input signal including noise and an echo by the estimated integrated and eliminated gain of nose and an echo, and may obtain the waveform of the final near-end speech signal from which noise and an echo have been finally eliminated by performing an inverse short-time Fourier transform (ISTFT) on the LPS of the near-end speech signal along with the phase of a signal including noise. That is, the final voice signal from which noise and an echo have been integrated and eliminated can be obtained.

As described above, the embodiments relate to a voice enhancement technology, and can derive more excellent performance by eliminating noise and an echo before performing a voice recognition and voice communication technology. Furthermore, the embodiments may be applied to improve voice call quality in a mobile terminal or Voice Talk in Kaka Talk.

Such a voice enhancement technology may be used to enhance performance of voice recognition in an environment including noise and an echo. Recently, voice recognition is performed in various Internet of thing (IoT) devices. The voice recognition is not performed only in a silent environment, but may also be performed in an environment including surrounding noise. When a sound is generated from the speaker of an IoT device, an echo may be generated because the sound enters the speaker again. Accordingly, performance of voice recognition performed in IoT devices can be improved by eliminating noise and an echo before the voice recognition is performed. Furthermore, the present embodiments can provide a voice of clean quality by being applied to various voice communication technologies because it provides a voice enhancement signal of excellent quality.

The above-described apparatus may be implemented as a hardware component, a software component and/or a combination of them. For example, the apparatus and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure the processor so that it operates as desired or may instruct the processor independently or collectively. The software and/or data may be embodied in a machine, component, physical device, virtual equipment or computer storage medium or device of any type or a transmitted signal wave permanently or temporarily in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may have been known to those skilled in the computer software. The computer-readable recording medium includes a hardware device specially configured to store and execute the program instruction, for example, magnetic media such as a hard disk, a floppy disk and a magnetic tape, optical media such as CD-ROM and a DVD, magneto-optical media such as a floptical disk, ROM, RAM, and flash memory. Examples of the program instruction may include high-level language code executable by a computer using an interpreter in addition to machine-language code, such as code written by a compiler.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments and equivalents of the claims belong to the scope of the claims.

The invention claimed is:

1. A method of integrating and eliminating noise and an echo based on a deep neural network (DNN), the method comprising, steps of:
   extracting a feature vector from a voice signal comprising noise and an echo; and
   obtaining a final voice signal from which noise and an echo have been integrated and eliminated using an integrated and eliminated gain of noise and an echo estimated through the feature vector and a training of the DNN,
   wherein the method further comprises a step of training the DNN,
   wherein the step of training the DNN comprises extracting feature vectors from a microphone input signal comprising noise and an echo and a far-end speech signal in a training stage; and estimating the integrated and eliminated gain of noise and an echo by using the feature vectors as input feature vectors for the DNN and passing the input feature vectors through a weight parameter and bias parameter which is a model of the trained DNN, and
   wherein the step of training the DNN further comprises a step of concatenating priori and posteriori signal-to-echo ratios (SERs) and priori and posteriori signal-to-noise ratios (SNRs), which are statistical information of a voice signal, and the extracted feature vectors and using the concatenated SERs and SNRs and extracted feature vectors as the input feature vectors for the DNN in the training stage.

2. The method of claim 1, wherein in the training stage, the step of extracting feature vectors from a microphone input signal comprising noise and an echo and a far-end speech signal in a training stage comprises:
   transforming a signal in a time domain into a signal into a frequency domain by performing a short-time Fourier transform (STFT) on the microphone input signal comprising noise and an echo and the far-end speech signal in the training stage, and
   extracting a log power spectrum (LPS) of the transformed signal in the frequency domain as the feature vector.

3. The method of claim 1, wherein the step of training the DNN comprises:
   estimating continuous optimal gains through a regression of the DNN, and
   performing the training of the DNN in such a manner that a difference between an integrated and eliminated gain of noise and an echo, which is a target feature vector, and an integrated and eliminated gain of noise and an echo estimated through the DNN is minimized using a mean squared error (MSE) as an object function of the DNN.

4. A method of integrating and eliminating noise and an echo based on a deep neural network (DNN), the method comprising steps of:
   extracting a feature vector from a voice signal comprising noise and an echo; and obtaining a final voice signal from which noise and an echo have been integrated and eliminated using an integrated and eliminated gain of noise and an echo estimated through the feature vector and a training of the DNN, wherein the step of extracting a feature vector from a voice signal comprising noise and an echo comprises steps of:

extracting feature vectors from a microphone input signal comprising noise and an echo and a far-end speech signal in a voice enhancement stage; and concatenating priori and priori and posteriori signal-to-echo ratios (SERs) and priori and posteriori signal-to-noise ratios (SNRs), which are statistical information of a voice signal, and the extracted feature vectors and using the concatenated SERs and SNRs and extracted feature vectors as input feature vectors for the DNN in the voice enhancement stage.

5. The method of claim 4, wherein in the voice enhancement stage, the step of extracting feature vectors from a microphone input signal comprising noise and an echo and a far-end speech signal comprises:

transforming a signal in a time domain into a signal in a frequency domain by performing a short-time Fourier transform (STFT) on the microphone input signal comprising noise and an echo and the far-end speech signal in the voice enhancement stage, and extracting a log power spectrum (LPS) of the transformed signal in the frequency domain as the feature vector.

6. The method of claim 5, wherein the step of obtaining a final voice signal from which noise and an echo have been integrated and eliminated using an integrated and eliminated gain of noise and an echo estimated through the feature vector and a training of the DNN comprises steps of:

obtaining a log power spectrum (LPS) of a near-end speech signal by multiplying an LPS of the microphone input signal comprising noise and an echo by the estimated integrated and eliminated gain of noise and an echo; and obtaining a waveform of a final near-end speech signal from which noise and an echo have been finally eliminated by performing an inverse short-time Fourier transform (ISTFT) on the LPS of the near-end speech signal along with a phase of a signal comprising noise and an echo.

7. An apparatus for integrating and eliminating noise and an echo based on a deep neural network (DNN), the apparatus comprising at least one processor to implement:

a feature vector extraction unit for extracting a feature vector from a voice signal comprising noise and an echo;

a voice signal reconstruction unit for obtaining a final voice signal from which noise and an echo have been integrated and eliminated using an integrated and eliminated gain of noise and an echo estimated through the feature vector and a training of the DNN; and a DNN training unit for training the DNN, wherein the DNN training unit comprises a feature vector extraction unit for extracting feature vectors from a microphone input signal comprising noise and an echo and a far-end speech signal in a training stage; and a DNN modeling unit for estimating the integrated and eliminated gain of noise and an echo by using the feature vectors as input feature vectors for the DNN and passing the input feature vectors through a weight parameter and bias parameter which is a model of the trained DNN, and wherein the feature vector extraction unit comprises a noise and echo information unit for concatenating priori and posteriori signal-to-echo ratios (SERs) and priori and posteriori signal-to-noise ratios (SNRs), which are statistical information of a voice signal, and the extracted feature vectors and using the concatenated SERs and SNRs and extracted feature vectors as the input feature vectors for the DNN in the training stage.

8. The apparatus of claim 7, wherein the feature vector extraction unit of the training unit comprises a spectrum extraction unit of the training unit for transforming a signal in a time domain into a signal into a frequency domain by performing a short-time Fourier transform (STFT) on the microphone input signal comprising noise and an echo and the far-end speech signal in the training stage and for extracting a log power spectrum (LPS) of the transformed signal in the frequency domain as the feature vector.

9. The apparatus of claim 7, wherein the DNN modeling unit estimates continuous optimal gains through a regression of the DNN, and performs the training of the DNN in such a manner that a difference between an integrated and eliminated gain of noise and an echo, which is a target feature vector, and an integrated and eliminated gain of noise and an echo estimated through the DNN is minimized using a mean squared error (MSE) as an object function of the DNN.

10. The apparatus of claim 7, wherein the feature vector extraction unit comprises:

a spectrum extraction unit for transforming a signal in a time domain into a signal in a frequency domain by performing a short-time Fourier transform (STFT) on the microphone input signal comprising noise and an echo and the far-end speech signal in the voice enhancement stage; and a noise and echo information unit for concatenating priori and priori and posteriori signal-to-echo ratios (SERs) and priori and posteriori signal-to-noise ratios (SNRs), which are statistical information of a voice signal, and the extracted feature vectors and using the concatenated SERs and SNRs and extracted feature vectors as input feature vectors for the DNN in the voice enhancement stage.

11. The apparatus of claim 10, wherein the voice signal reconstruction unit obtains a log power spectrum (LPS) of a near-end speech signal by multiplying an LPS of the microphone input signal comprising noise and an echo by the estimated integrated and eliminated gain of noise and an echo, and obtains a waveform of a final near-end speech signal from which noise and an echo have been finally eliminated by performing an inverse short-time Fourier transform (ISTFT) on the LPS of the near-end speech signal along with a phase of a signal comprising noise and an echo.

* * * * *